United States Patent Office
3,091,123
Patented May 28, 1963

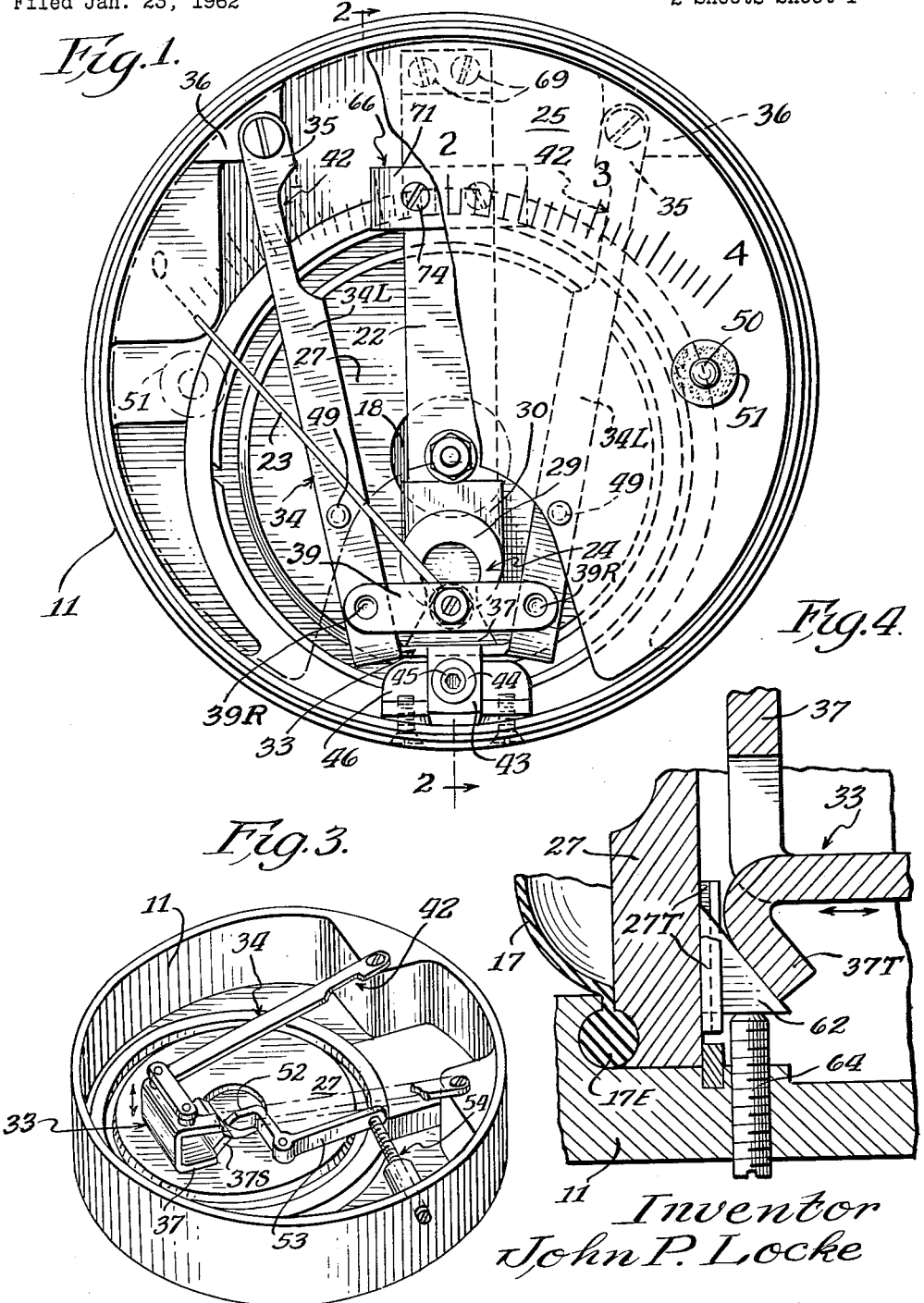

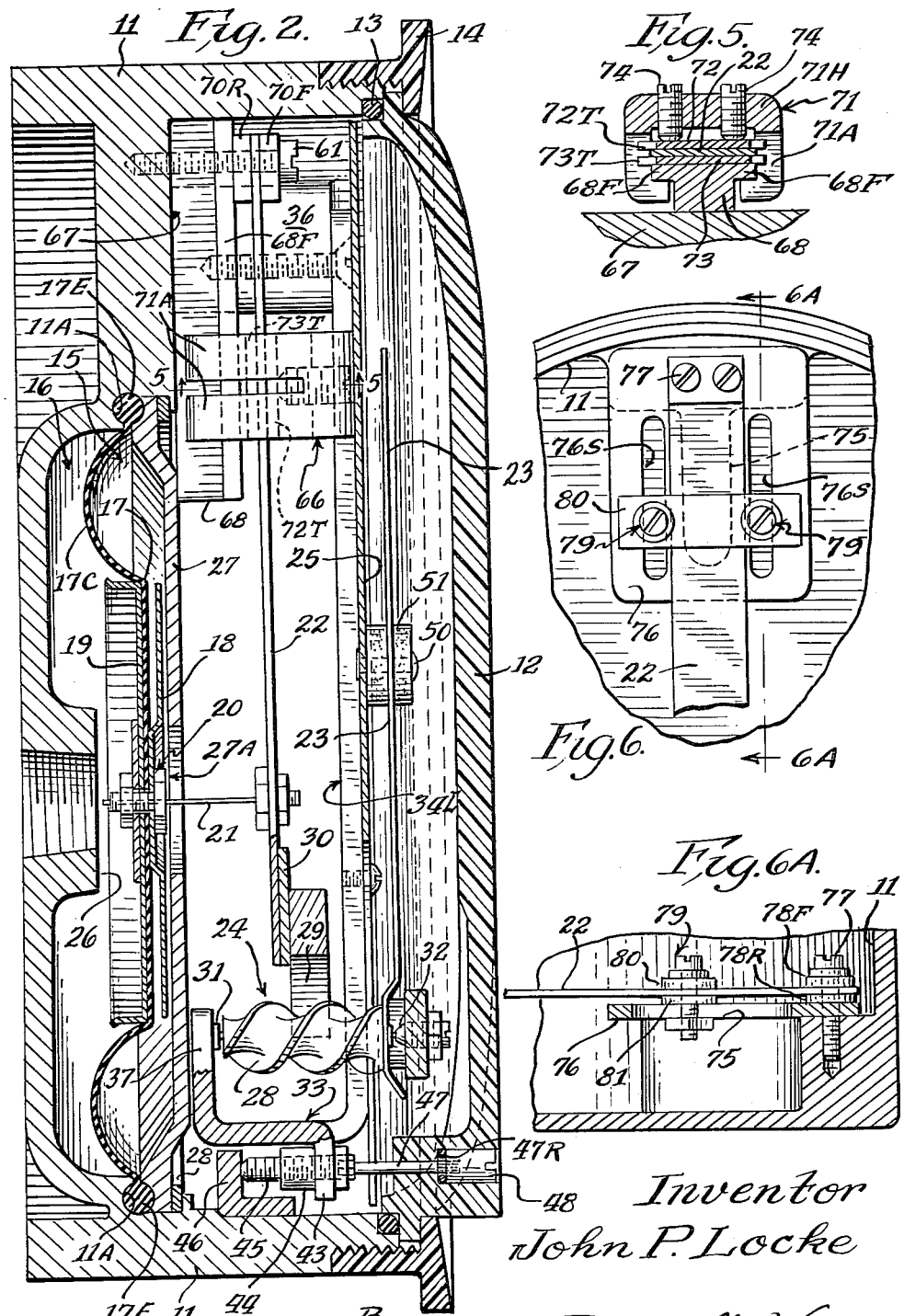

3,091,123
PRESSURE GAUGE
John P. Locke, Michigan City, Ind., assignor to F. W. Dwyer Mfg. Company, a corporation of Illinois
Filed Jan. 23, 1962, Ser. No. 168,192
11 Claims. (Cl. 73—407)

This invention relates to a pressure gauge for reading static pressure, air velocity, draft, air resistance or gas pressure in any equipment involving air movement, and has for its principal object the provision of a novel gauge arrangement that facilitates zero setting and calibration adjustments.

More particularly, the invention is concerned with a pressure gauge of the type employing a differential pressure capsule equipped with a flexibly distortable power diaphragm responsive to fluid pressure differentials and connected to operate a sensitive and accurate motion transforming type of indicator mechanism mounted directly in the capsule.

Another object of the invention is the provision of a pressure gauge of the above type wherein an externally accessible precision zero-set mechanism is provided.

Still another object of the invention is the provision of a pressure gauge suitable for panel or surface stationary mounting or useful as a portable gauge.

A further object of the invention is the provision of a pressure gauge utilizing a magnetically coupled type of translational-to-rotary motion transforming means wherein a magnet is movable along a helix to produce swinging movement of the helix and of an indicator carried thereby, with the helix being disposed in pivot structure carried on a floating support which is adjustably positioned by the zero-set mechanism.

Another object of the invention is to provide a simplified calibration adjustment for a cantilever type leaf spring utilized in such a pressure gauge.

Still a further object of the invention is the provision of protective abutment structure adjacent the power diaphragm of the pressure capuse for limiting its excursion to a range of movement that will not damage the delicate moving parts of the indicator mechanism.

Other objects and advantages will become apparent during the course of the following description.

In the accompanying drawings forming a part of this specification and in which like numerals are employed to designate like parts throughout the same:

FIG. 1 is an enlarged face view of a pressure gauge constructed in accordance with this invention with portions of the scale face thereof broken away to facilitate disclosure of the internal mechanism;

FIG. 2 is a transverse sectional view taken on the line 2—2 of FIG. 1 and showing the cover and mounting ring engaged to the gauge casing;

FIG. 3 is a perspective view illustrating an alternative form of zero-set mechanism;

FIG. 4 is an enlarged fragmentary sectional view illustrating still another form of zero-set mechanism;

FIG. 5 is a sectional view taken on the line 5—5 of FIG. 2 and illustrating the details of the spring calibration mechanism of the preferred form of the invention;

FIG. 6 is a fragmentary plan view illustrating an alternative form of calibration mechanism; and FIG. 6A is a detailed sectional view taken on the line 6A—6A of FIG. 6.

Referring now to the drawings, a pressure gauge is illustrated in FIGS. 1 and 2 as comprising a differential pressure capsule composed of a gauge body 11 of die-cast aluminum and a transparent molded plastic cover 12 clamped in sealing relation against an O-ring 13 around the top of the gauge body by a cover ring 14 which screws onto a threaded annular wall encircling the top of the gauge body.

The gauge body of the preferred arrangement that is illustrated herein for purposes of disclosure has contoured base wall structure providing a recessed generally circular pressure cavity offset from the center of the gauge body and divided into high pressure and low pressure chambers 15 and 16, respectively, by an edge mounted power diaphragm 17 that is flexibly distortable in accordance with the pressure differentials to which it is subjected. The diaphragm may be of rubber or other similar flexibly distortable material and is provided with an enlarged seal edge 17E that borders an annular convolution 17C that accommodates susbtantially free movement of the central body region in response to pressure differentials acting upon it.

Metal plates 18 and 19 are affixed centrally on opposite faces of the diaphragm and carry an anchor nut assembly 20 which is connected to one end of a force transmitting link 21 which is connected to actuate an indicating mechanism that includes a number of delicate and sensitive movable operating parts all of which are disposed between the cover plate 12 and the diaphragm 17. These parts include a pre-calibrated deflection spring 22, a rotatable indicator arm 23, and a motion transforming mechanism 24 operable to convert essentially straight line deflection movement imparted to the spring 22 into a corresponding range of rotational movement of the indicator arm 23.

In the arrangement illustrated herein for purposes of disclosure, the gauge is shown with a scale face 25 having a neutral or zero set position at one extremity of the scale and the indicator arm 23 is shown at this position in FIG. 1 and in normal operation is arranged to be deflected only uni-directionally therefrom. For such an arrangement, the high pressure chamber 15 occupies the entire interior region of the capsule between the cover plate 12 and the diaphragm 17.

During normal operation of the gauge, therefore, the diaphragm will be deflected from right-to-left (as viewed in FIG. 2 or towards the base wall structure of the gauge body to tension the force transmitting link 21 and deflect the calibration spring 22 correspondingly to cause the motion translating mechanism to provide a corresponding swing of the indicator arm. Leftward movement of the diaphragm is limited by an upraised annular abutment 26 provided on the base wall structure of the gauge body centrally of its pressure cavity. A similar constraint of the upward excursion of the diaphragm is provided by mounting a rigid shield 27 across the upper face of the diaphragm 17. As best seen in FIG. 2 the pressure cavity is bordered by annular internal side wall structure of diametrically stepped configuration to present an exposed outwardly facing intermediate annular shoulder 11A on which the marginal edge 17E of the diaphragm is seated. The rigid shield 27 has its outer edge overlying this annular shoulder and held seated against the enlarged seal edge 17E of the diaphragm by means of a lock ring 28. The main body portion of the shield 27 is normally spaced a short distance from the diaphragm and is provided with a central aperture 27A through which extends the force transmitting link 21.

As previously mentioned, a magnetically coupled mechanism 24 is provided for transforming essentially straight line translational movement imparted to the deflection spring 22 by the diaphragm 17, into rotary movement of the indicator arm 23. This magnetic coupling mechanism eliminates mechanical friction and lends itself to construction of a sensitive and accurate gauge. The coupling consists of a helix 28 rotatably positioned by a permanent magnet 29 of flat C-shaped configuration secured to a mounting pad 30 carried at the free end of the deflection spring 22 so that the magnet poles are disposed end-wise outwardly of the spring. The spring deflection transcribes a sufficiently small arc so that the magnet undergoes essentially straight line movement alongside the axis of the helix. The magnet poles are arranged symmetrically to the axis of rotation of the helix and, upon axial movement of the magnet, the helix undergoes rotational follower movement so as to maintain a minimum air gap across the magnet poles. The helix 28 has its opposite ends journalled in jeweled bearings 31 and 32 that are carried in a floatingly adjustable pivot structure 33. The helix projects beyond the plane of the scale face 25 and carries the indicator arm 23 adjacent its outer jewel 32. Leftward movement of the magnet 29 along the axis of the helix 28 generates clockwise rotation, as viewed in FIG. 1, of the helix and its indicator arm.

In accordance with this invention, the pivot structure 33 is floatingly suspended to facilitate adjustment thereof to various stable positions for establishing an accurate zero set of the gauge. If the indicator arm 23 reads above zero, the pivot structure is moved leftwardly relative to the magnet to move the indicator arm 23 counterclockwise until it returns to zero. Correspondingly if the indicator arm reads lower than zero, the pivot structure is adjusted to the right.

In the preferred form of the invention illustrated herein for purposes of disclosure, a wishbone shaped support lever 34 has its ends 35 anchored in integral embossures 36 provided in the die-cast body and mounts the pivot structure 33 at its mid-point. The pivot structure portion of the wishbone support lever 34 consists of an integral bridge-like section integrally mounting a pie-shaped rear plate 37 that carries a jewelled rear pivot bearing 31 and also includes a front plate 39 spanning and fixed to the legs of the wishbone by suitable rivets 39R that extend through spacing collars provided between the front plate 39 and the wishbone legs 34L. The front plate 39 carries a jewelled front pivot bearing 32.

The legs 34L of the wishbone are relieved at locations 42 adjacent the anchored ends thereof to impart desired flexibility and the relieved portions of the legs are kinked to bias the pivot structure 33 of the wishbone in a leftward direction.

The bridge-like mid-section of the wishbone lever also includes an integral seat flange 43 outboard of the pivot structure and equipped with a threaded socket 44 equipped with an adjustable Allen-head type screw 45. A stop bracket 46 is affixed to the side wall of the gauge body 11 to serve as an abutment against which reacts the tip of the adjustment screw 45. The pivot structure 33 may be shifted upwardly or downwardly by opposite rotations of the screw 45 and in the preferred arrangement, an actuating pin 47 for this adjustment screw is sealingly mounted in slidable and rotatable relation within a cylindrical passage 48 that extends through a thickened portion of the cover plate. An O-ring 47R is disposed within the larger diameter outer end of the passage 48 to seal between the pin 47 and the cover plate. The actuating pin is slotted at its outer end for receiving a screwdriver and has a wrench tip at its inner end for engagement in the Allen-head screw.

Thus the actuating pin 47 is rotated to adjust the position of the pivot structure 33 and hence the zero set position of the indicator arm 23. The bias given to the wishbone lever by slight kinking at the relieved portions 42 of its legs causes the pivot structure to seat the adjustment screw 45 against the stop 46 and maintain a stable position of adjustment for the helix. The wishbone lever is of a size and configuration to straddle the deflection spring 22 and the magnet 29. Preferably, the legs 34L of the wishbone lever 34 are located forwardly of the magnet and the scale face 25 is affixed directly to the wishbone by suitable attachment screws 49 so that the wishbone carries the helix 28, the indicator arm 23, and the scale face 25 for joint movement therewith. The scale face 25 also carries metal posts 50 equipped with foam plastic bumpers 51 for cushioning extreme movements of the indicating arm 23.

An alternative adjustment mechanism for varying the position of the pivot structure to effect zero set is shown in FIG. 3 wherein the pivot structure 33 of the wishbone lever 34 has its integral rear plate 37 extended to provide a shoe 37S having an obliquely upwardly directed cam surface that is cooperable with a positioning wedge 52 disposed at the end of a bell crank lever 53 that is pivoted to the outer face of the rigid shield 27. The opposite end of the bell crank is engaged to and controllably positioned by an adjustment screw arrangement 54. This adjustment screw projects through the side wall of the gauge body and the arrangement of FIG. 3 may be employed wherever a surface mounted gauge is not required to be adjusted from the front. Here again, the legs of the wishbone 34 are relieved and kinked as indicated at 42 to bias the pivot structure towards the positioning wedge 52 so that a positive and stable zero-set adjustment may be provided.

In FIG. 4 another arrangement is shown wherein the wishbone pivot structure has an inclined tab 37T struck out from its rear plate 37 and projecting outboard therefrom to function as an inclined cam surface that cooperates with an inwardly directed positioning wedge 62 which is carried directly on a positioning screw arrangement 64 extending through the side wall of the gauge body 11. The wedge 62 is slidable between tracks 27T that provide a guideway along the outer face of the shield 27 that seals the diaphragm 17 to the gauge body.

The calibration of the deflection spring 22 must be carried out individually for each gauge and, to facilitate this, an adjustable clamping mechanism 66 is provided for varying the effective fulcrum point of the spring and hence its effective stiffness in resisting deflection. The gauge body 11 is preferably provided with an integral spring anchorage formation in the form of a runway 67 located between the anchorages for the wishbone and extending from the side wall of the gauge body towards the pivot structure. This runway is inclined slightly forwardly. A track 68 is fixed on the runway by means of anchoring screws 69 that also project through front and rear mounting pads 70F and 70R for the base or dead end of the cantilever spring 22. The track has elongated side flanges 68F (FIG. 5) providing locking guideways on which a C-shaped clamp 71 is slidably adjustable. This clamp has bifurcated arms 71A (FIG. 2) providing aligned retainer slots for engagement with projecting tabs 72T and 73T that are provided on front and rear fulcrum shoes 72 and 73, respectively, which are disposed within the C-clamp 71 in sandwiched relation about the cantilever spring 22. Locking screws 74 are provided in the header portion 71H of the clamp and press the fulcrum shoes 72 and 73 into tight gripping engagement with the cantilever spring 22. This entire clamp assembly is easily shifted along the track and secured in place by the screws 74 until the correct calibration is achieved.

An alternative spring calibration arrangement is shown in FIGS. 6 and 6A wherein the gauge body has a spring anchorage formation providing a runway 75 having a generally T-shaped plan configuration. A rectangular plate 76 is anchored to the runway 75 by screws 77 that project through front and rear mounting pads 78F and 78R that mount the spring 22 in spaced relation to the plate 76. The plate 76 is provided with overhanging portions having corresponding lengthwise slots 76S along opposite sides of the runway to provide guideways for locking screw and nut assemblies 79 which project through opposite ends of a pair of cooperating fulcrum shoes 80 and 81. The fulcrum shoes are adjustable to any position along the length of the guide slots and then tightened by means of the nut and screw assemblies 79 to define the fulcrum point for the spring 22. Once again the cantilever spring 22 is supported along an angle inclined slightly forwardly from horizontal. Preferably, this is accomplished by forming the runway provided in the gauge body with the desired angle of incline.

While the motion of the magnet carried on the deflection spring is described as essentially straight line, this is only approximately true because the magnet moves on an arc that subtends a very slight angle. It is desirable that the magnet be closest to the helix axis at the center of its range of movement, and for a gauge of the type disclosed herein, this corresponds to the mid-scale position of the indicating arm. Therefore, the spring 22 is mounted so that when it is at its left-hand or zero position, the magnet will be slightly forward of the center of its range of swinging movement and will move through and beyond true normal as the indicator arm undergoes full scale deflection.

It should be apparent that the gauge construction illustrated herein may be employed with center reading indicators in which case the neutral position of the deflection spring 22 should lie in a plane essentially normal to the helix axis. In this event, either chamber may at times be subjected to higher or lower pressure than the other. Similarly, the gauge may be employed where the rear chamber 16 is to be at higher pressure, in which case the force transmitting link 21 may be in the form of a rigid rod connected by a clevis to provide the required freedom of movement. Such a rigid rod and clevis arrangement could transmit both compression and tension forces whereas the relatively thin wire shown in FIG. 2 is intended primarily only for tension. The gauge construction also lends itself to use with accessory items such as maximum indicating pointers or adjustable signal flags which may be mounted to the cover to cooperate with the indicating arm in the usual fashion. The gauge body may also be equipped with both rear and side entry ports to each of its chambers to increase the flexibility of application of the gauge.

It should be understood that the description of the preferred form of the invention is for the purpose of complying with Section 112, Title 35, of the U.S. Code and that the appended claims should be construed as broadly as the prior art will permit.

What is claimed is:

1. A device for zero setting a gauge that includes translational-to-rotary motion-transforming-means comprising a helix mounted for rotation about its axis and a magnet for producing proportional rotation of said helix in response to translational movement of the magnet alongside the axis of the helix, an indicator connected to said helix for rotation therewith, a deflection spring carrying the magnet at a position to establish magnetically coupled relation to the helix, and a sense mechanism connected to deflect said spring in a direction to shift said magnet generally translationally alongside said axis, said device comprising a wishbone support having its free ends anchored and having its mid-point floating and equipped with mounting pivots to support said helix for rotation about said axis, and an adjustment mechanism engageable with said wishbone support adjacent said mid-point to stabilize the position thereof and operable in opposite directions to shift said helix along the direction of its axis to establish and maintain a zero-set position.

2. In a gauge that includes translational-to-rotary motion-transforming-means comprising a helix mounted for rotation about its axis and a magnet for producing proportional rotation of said helix in response to translational movement of the magnet alongside the axis of the helix, a scale face, an indicator connected to said helix for rotation therewith to swing across said scale face, a cantilever type deflection spring having its free end carrying the magnet at a position to establish magnetically coupled relation to the helix, clamping structure fixing the other end of the spring at an angle slightly inclined to the helix axis to center the indicator on the scale face when the magnet is disposed on a line substantially normal to the helix axis, and a sense mechanism connected to deflect said spring in a direction to shift said magnet translationally alongside said axis, a flexible support lever having one extremity thereof anchored and having a remote portion thereof floating and equipped with mounting pivots to support said helix for rotation about said axis, and an adjustment mechanism engageable with said support lever adjacent said remote portion to stabilize the position thereof and operable in opposite directions to shift said helix along the direction of its axis to establish a fixed zero-set position.

3. In a gauge that includes translational-to-rotary motion-transforming-means comprising a helix mounted for rotation about its axis and a magnet for producing proportional rotation of said helix in response to translational movement of the magnet alongside the axis of the helix, a scale face, an indicator connected to said helix for rotation therewith to swing across said scale face, a cantilever type deflection spring having its free end carrying the magnet at a position to establish magnetically coupled relation to the helix, and a sense mechanism connected to deflect said spring in a direction to shift said magnet translationally alongside said axis, a flexible support lever having one extremity thereof anchored and having a remote portion thereof floating and equipped with mounting pivots to support said helix for rotation about said axis, and an adjustment mechanism engageable with said support lever adjacent said remote portion to stabilize the position thereof and operable in opposite directions to shift said helix along the direction of its axis to establish a fixed zero-set position.

4. In a gauge that includes translational-to-rotary motion-transforming-means comprising a helix mounted for rotation about its axis and a magnet for producing proportional rotation of said helix in response to translational movement of the magnet alongside the axis of the helix, an indicator connected to said helix for rotation therewith, a cantilever type deflection spring anchored at one end to provide a fulcrum and carrying the magnet at its free end in magnetically coupled relation to the helix, a sense mechanism connected to deflect said spring in a direction to shift said magnet translationally alongside said axis, a wishbone support having its free ends anchored in flanking relation to the fulcrum and having its mid-point disposed adjacent the free end of said spring and floating relative thereto and equipped with mounting pivots to support said helix for rotation about said axis, and an adjustment mechanism engageable with said wishbone support adjacent said mid-point to stabilize the position thereof and operable in opposite directions to shift said helix along the direction of its axis to establish and maintain a zero-set position.

5. In a pressure gauge, a differential pressure capsule having a flexibly distortable partitioning diaphragm separating high and low pressure chambers, said capsule including a gauge body mounting said diaphragm and providing spring anchorage structure and support anchorage structure adjacent one edge of the diaphragm, a cantilever deflection spring having one end engaged to said spring anchorage structure and projecting across said diaphragm in spaced relation thereto, a flexible support lever extending across said diaphragm in spaced relation thereto and having one extremity fixed to said support anchorage structure and having a remote portion thereof floating and equipped with pivot structure to define an axis of rotation generally normal to said diaphragm, translational-to-rotary motion-transforming-means comprising a helix mounted in said pivot structure to rotate on the axis defined thereby and a magnet carried on said spring at a position to establish magnetically coupled relation to the helix for producing proportional rotation of the helix in response to translational movement of the magnet alongside the axis of the helix, an indicator connected to the helix for rotation therewith, force transmitting means connecting said diaphragm to said spring to move said magnet alongside said axis in accordance with distortion of said diaphragm, and means mounted to said capsule and engageable with said remote portion of said support lever to establish a stable position thereof.

6. In a pressure gauge, a differential pressure capsule having a flexibly distortable partitioning diaphragm separating high and low pressure chambers, said capsule including a gauge body mounting said diaphragm and providing spring anchorage structure and support anchorage structure adjacent one edge of the diaphragm, a cantilever deflection spring having one end engaged to said spring anchorage structure and projecting across said diaphragm in spaced relation thereto, a flexible support lever extending across said diaphragm in spaced relation thereto and having one extremity fixed to said support anchorage structure and having a remote portion thereof floating and equipped with pivot structure to define an axis of rotation generally normal to said diaphragm, translational-to-rotary motion-transforming-means comprising a helix mounted in said pivot structure to rotate on the axis defined thereby and a magnet carried on said spring at a position to establish magnetically coupled relation to the helix for producing proportional rotation of the helix in response to translational movement of the magnet alongside the axis of the helix, an indicator connected to the helix for rotation therewith, force transmitting means connecting said diaphragm to said spring to move said magnet alongside said axis in accordance with distortion of said diaphragm, and adjustment mechanism having an externally accessible portion sealingly mounted in movable relation in exterior wall structure of said capsule and having an internally located portion engageable with said remote portion of said support lever to establish a stable position thereof, said internally located portion being operable in opposite directions by actuation of said externally accessible portion to shift said helix along the direction of its axis to establish and maintain a zero-set position.

7. In a gauge in accordance with claim 6, wherein said capsule includes a face cover sealed to said body and said adjustment mechanism is sealingly mounted in movable relation in the cover.

8. In a pressure gauge, a differential pressure capsule having a flexibly distortable partitioning diaphragm separating high and low pressure chambers, said capsule including a gauge body mounting said diaphragm and providing spring anchorage structure adjacent one edge of the diaphragm and flanked by support anchorage structures, a cantilever deflection spring having one end engaged to said spring anchorage structure and projecting across said diaphragm in spaced relation thereto, a wishbone support extending across said diaphragm in spaced relation thereto and having its free ends fixed to said support anchorage structures and having its mid-point floating and equipped with pivot structure to define an axis of rotation generally normal to said diaphragm, translational-to-rotary motion-transforming means comprising a helix mounted in said pivot structure to rotate on the axis defined thereby and a magnet carried on said spring at a position to establish magnetically coupled relation to the helix for producing proportional rotation of the helix in response to translational movement of the magnet alongside the axis of the helix, an indicator connected to the helix for rotation therewith, force transmitting means connecting said diaphragm to said spring to move said magnet alongside said axis in accordance with distortion movement of said diaphragm and means mounted to said capsule and engageable with said midpoint of said wishbone support to establish a stable position thereof.

9. In a pressure gauge, a differential pressure capsule having a flexibly distortable partitioning diaphragm separating high and low pressure chambers, said capsule including a gauge body mounting said diaphragm and providing spring anchorage structure adjacent one edge of the diaphragm and flanked by support anchorage structures, a cantilever deflection spring having one end engaged to said spring anchorage structure and projecting across said diaphragm in spaced relation thereto, a wishbone support extending across said diaphragm in spaced relation thereto and having its free ends fixed to said support anchorage structures and having its mid-point floating and equipped with pivot structure to define an axis of rotation generally normal to said diaphragm, translational-to-rotary motion-transforming-means comprising a helix mounted in said pivot structure to rotate on the axis defined thereby and a magnet carried on said spring at a position to establish magnetically coupled relation to the helix for producing proportional rotation of the helix in response to translational movement of the magnet alongside the axis of the helix, an indicator connected to the helix for rotation therewith, and force transmitting means connecting said diaphragm to said spring to move said magnet alongside said axis in accordance with distortion movement of said diaphragm, and an adjustment mechanism engageable with said wishbone support adjacent said mid-point to stabilize the position thereof and operable in opposite directions to shift said helix along the direction of its axis to establish and maintain a zero-set position.

10. The arrangement of claim 2 wherein said clamping structure includes a track oriented at said angle of incline and providing correspondingly oriented guideways, a pair of fulcrum shoes movable along said track and embracing said spring to define a fulcrum point therefor, and adjustment screws carried on said track and engageable with said shoes to secure the parts of the clamping structure in any selected position along the track.

11. In a pressure gauge, a differential pressure capsule having a flexibly distortable partitioning diaphragm separating high and low pressure chambers, said capsule including a gauge body mounting said diaphragm and providing spring anchorage structure adjacent one edge of the diaphragm and flanked by support anchorage structures, a cantilever deflection spring having one end engaged to said spring anchorage structure and projecting across said diaphragm in spaced relation thereto, a wishbone support extending across said diaphragm in spaced relation thereto and having its free ends fixed to said support anchorage structures and having its mid-point floating and equipped with pivot structure to define an axis of rotation generally normal to said diaphragm, a scale face fixed to said wishbone lever in overlying relation thereto, translation-to-rotary motion-transforming-means comprising a helix mounted on said pivot structure to rotate on the axis defined thereby and a magnet carried on said spring at a position to establish magnetically coupled relation to the helix for producing proportional rotation of the helix in response to translational movement of the magnet alongside the axis of the helix, an indicator connected to the helix for rotation therewith and disposed to extend across and cooperate with said scale face, force transmitting means connecting said diaphragm to said spring to move said magnet alongside said axis in accordance with distortion movement of said diaphragm and means mounted to said capsule and engageable with said midpoint of said wishbone support to establish a stable position thereof.

References Cited in the file of this patent

UNITED STATES PATENTS

| 2,617,300 | Kinderman | Nov. 11, 1952 |
| 2,722,837 | Dwyer | Nov. 8, 1955 |

FOREIGN PATENTS

| 557,639 | Great Britain | Nov. 29, 1943 |